June 8, 1948. M. C. CAUGHREAN 2,442,918
HEAVY DUTY SLED
Filed Dec. 30, 1944 3 Sheets-Sheet 3
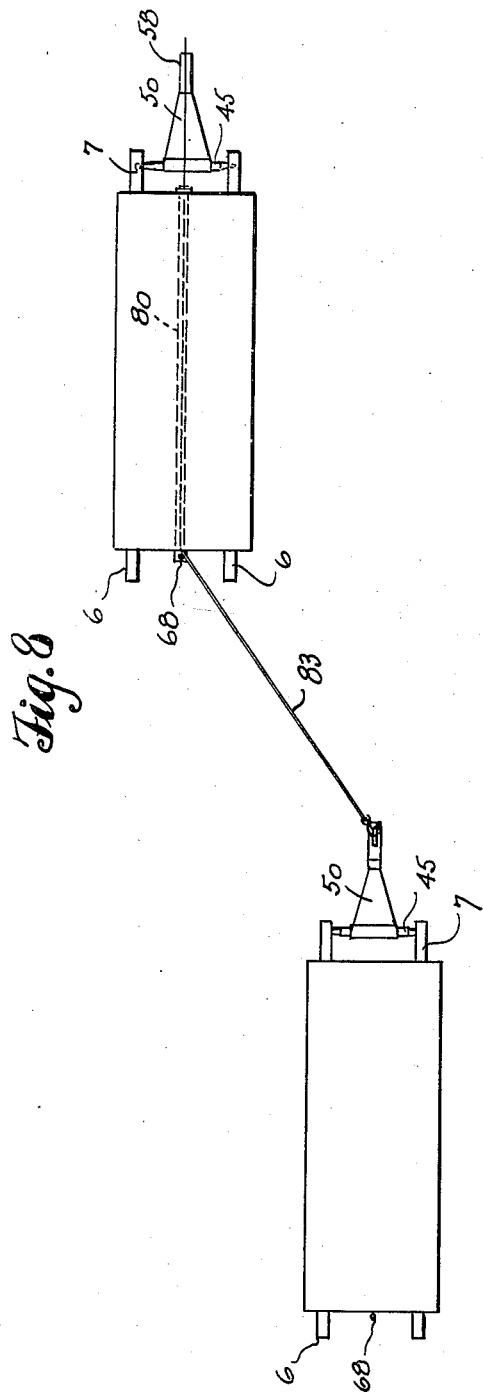
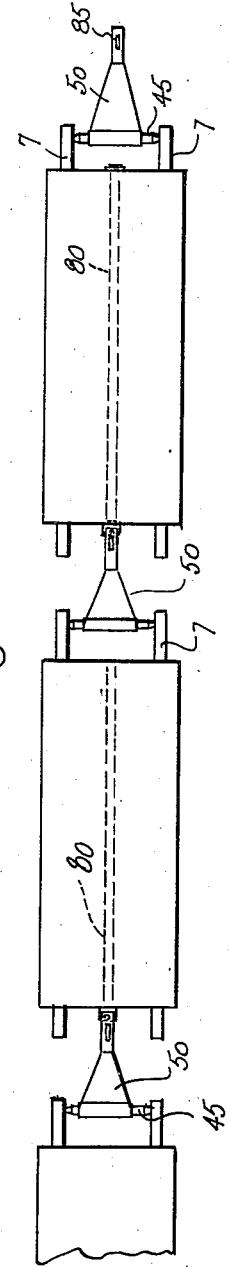
INVENTOR
MILO C. CAUGHREAN
BY
Cook + Robinson
ATTORNEYS

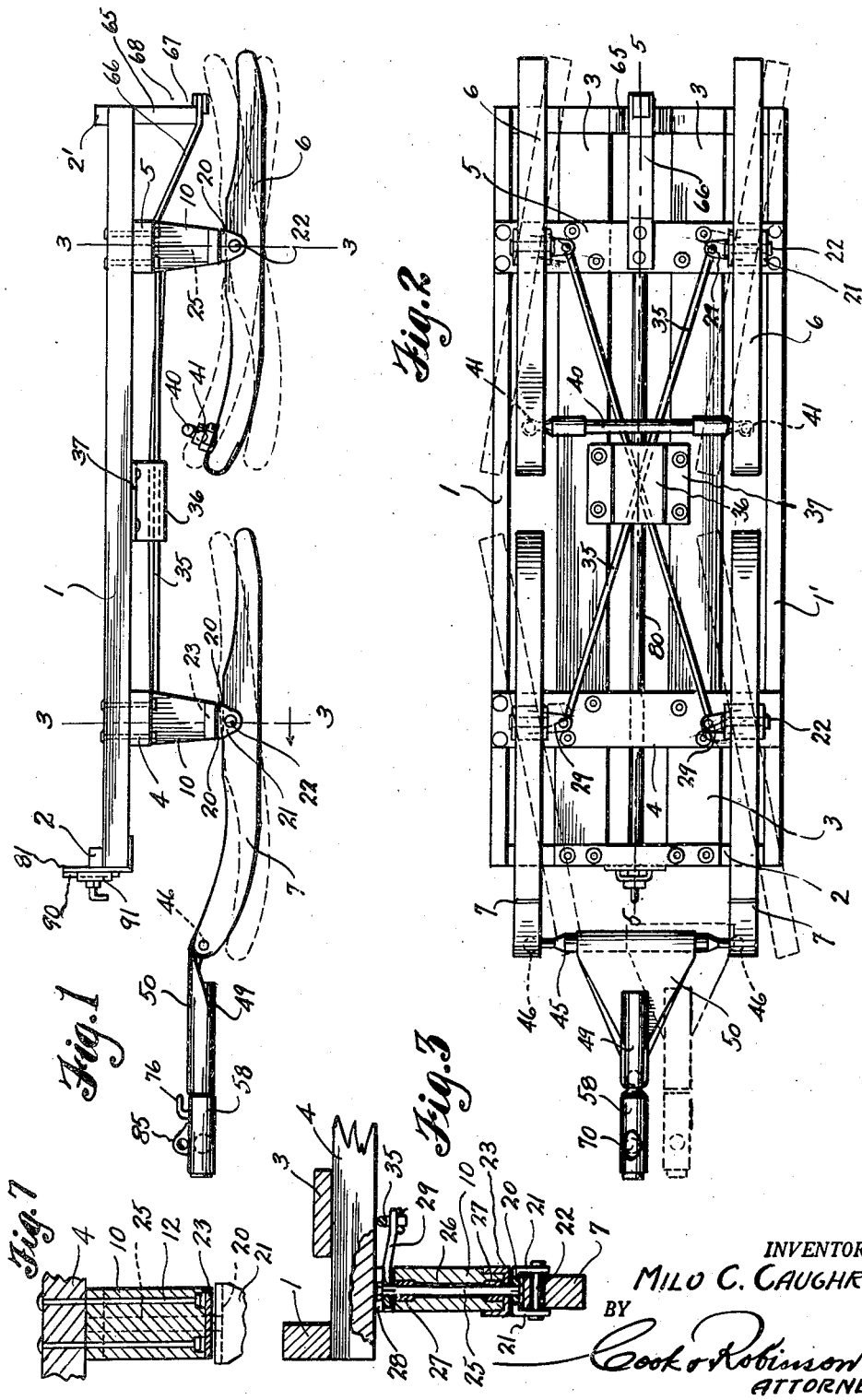

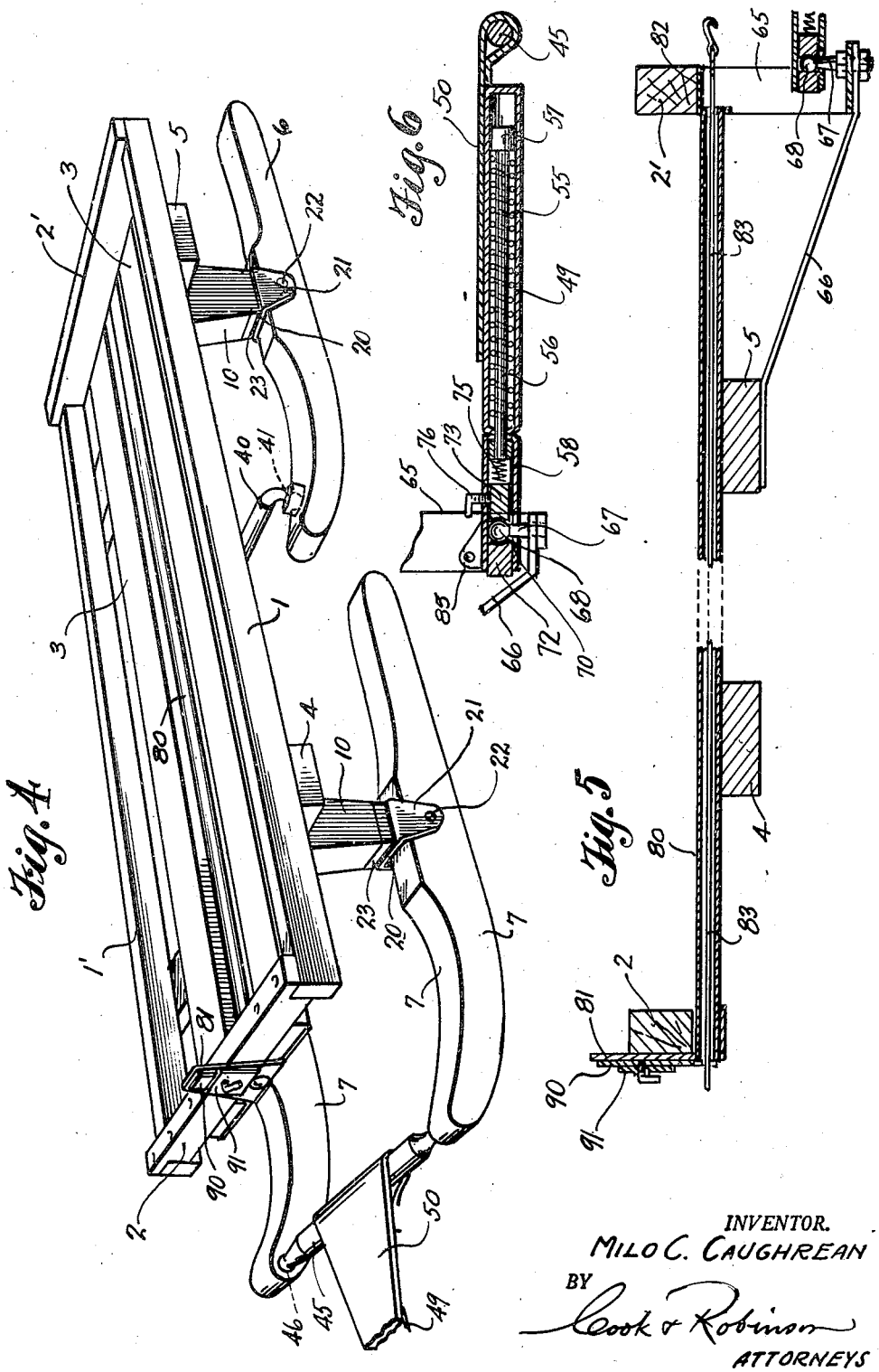

Patented June 8, 1948

2,442,918

UNITED STATES PATENT OFFICE 2,442,918

HEAVY-DUTY SLED

Milo C. Caughrean, Seattle, Wash.

Application December 30, 1944, Serial No. 570,543

6 Claims. (Cl. 280—15)

This invention relates to improvements in snow sleds and it has reference more particularly to sleds of large size and designed particularly for the hauling of heavy loads; for example, for the transportation of heavy freight over rough and winding roads such as the roads and trails encountered in Alaska in winter time.

It is the principal object of this invention to provide a sled of the above character that will withstand the strains and stresses of heavy hauling over rough and uneven surfaces, and which is adapted to be drawn entrain with other like sleds with safety and when so drawn will accurately track with the next forward sled.

More specifically stated, the principal objects of the present invention reside in the provision of a sled having a forward and a rearward set of runners, and which is especially adapted to heavy hauling over rough and winding roadways by reason of a novel manner of mounting each of the four runners for pivotal action, independent of action of the others. Furthermore, by reason of a novel means and method of interconnecting the runners of the forward set with those of the rearward set, so as to insure accurate tracking of the runners in making turns; and wherein novel means is provided for connecting such sleds entrain for safe operation and steering control on winding roadways.

Another object of the invention is to provide novel means for the easy and convenient connection of sleds one with another.

Other objects of the invention are to be found in the various details of construction of parts, and in their combination and mode of use as will hereinafter be fully described.

In accomplishing these and other objects of the invention, I have provided the improved details of construction; the preferred forms of which are illustrated in the accompanying drawings, wherein—

Fig. 1 is a side view of a sled embodied by the present invention.

Fig. 2 is a bottom view of the same, particularly illustrating the linkage that interconnects the runners of forward and rearward sets for steering control and to insure tracking of the runners in making turns.

Fig. 3 is a sectional detail, taken on line 3—3 in Fig. 1, illustrating the pivotal mounting of a runner for rocking action and steering action.

Fig. 4 is a perspective view of the sled.

Fig. 5 is a longitudinal sectional detail on line 5—5 in Fig. 2, showing the sled coupling devices.

Fig. 6 is a sectional detail of the draft tongue.

Fig. 7 is a sectional detail of a runner mounting.

Fig. 8 is a plan view diagrammatically illustrating the means for and method of assembling sleds entrain.

Fig. 9 is a plan view showing two sleds as joined entrain.

Referring more in detail to the drawings—

The present sled has a horizontal bed of substantial dimensions, comprising opposite, longitudinal side rails or beams 1 and 1' that are joined rigidly across forward and rearward ends by cross beams 2 and 2'. Between the side rails, longitudinally of the bed, spaced bottom boards 3 are arranged; these being bolted, or otherwise secured at their ends to the under sides of cross beams 2 and 2'.

The bed is mounted on heavy cross bunks 4 and 5 that are bolted solidly to the boards 3, and at their ends to the longitudinal beams 1 and 1' at suitable distances from front and rear ends of the bed.

The parts making up the bed as above described, preferably are of wood, in order to permit a certain desired degree of flexibility in the bed, and all parts are securely joined by bolts or as otherwise required in order to withstand the heavy stresses and strains to which they are subjected incident to their intended use.

The bed of the sled is supported for travel on a forward pair and a rearward pair of sled runners. All runners are of substantial length and width and preferably are made of wood. Furthermore, all runners are of substantially the same size and shape and those of the rear pair, designated by reference character 6, are spaced apart exactly the same distance as those of the front set, designated by reference character 7, in order that they will track therewith.

A feature of this invention resides in the fact that each runner has pivotal action independent of the others. Each is mounted at the lower end of a heavy block or supporting leg 10. These blocks, or legs, are fixed solidly to the outer end portions of the cross bunks 4 and 5, as noted in Fig. 3. The means for securing the legs comprises the bolts 12 which, as shown in Fig. 7, are extended upwardly through the legs and through the bunks where they are securely fastened. The legs 10 are equally spaced from the longitudinal center of the bed, and the cross bunks are so located that an even distribution of weight on each runner may be obtained.

The manner of pivotally mounting each runner on its corresponding mounting block or leg for rocking action, is best shown in Figs. 1 and 3, wherein it is noted that a metal yoke is applied over the top side of each runner substantially at a medial location between its ends. Each yoke comprises a base plate 20 and at the ends of this plate are flanges 21 that extend down along opposite sides of the runner and a pivot bolt 22 is applied therethrough as a means of pivotally securing the runner to the yoke for up and down rocking action at its ends; such rocking action being indicated in dotted line showing of the runners in Fig. 1.

The plate 20 rests against a wear yoke base plate 23 that is secured flatly to the flat lower end surface of the leg.

Fixed in the plate 20 centrally over the runner is a steering post or shaft 25, see Fig. 3, that is contained rotatably within a vertical hole 26 in the leg. Bushings 27 are fitted in the hole to mount the shaft for easy turning, and to avoid wear on the leg.

The upper end of the shaft 25 terminates within a transverse recess 28 formed in the upper end of the leg, and fixed to this end is a steering arm 29. The steering arm of each runner extends inwardly from the leg, as understood by reference to Figs. 2 and 3.

For the purpose of effecting the turning adjustment of the paired runners of the rear set in accordance with turning adjustment of runners of the forward set, I have connected the steering arms 29 of the two runners of the rear set with the opposite arms of the runners of the forward set by the pair of crossed links 35 shown in Fig. 2. The connection and the length of the arms 29 in relation to each other is such that when the forward set of runners are directed straight ahead as shown in Fig. 2, the runners of the rearward set will likewise be directed straight ahead, and will follow in the tracks made by runners of the forward set. However, should the forward runners be turned slightly to one side or the other, the rearward runners will be turned accordingly in an opposite direction so that they will expedite turning and at the same time will positively track with the forward runners in making a turn.

The cross links, at their points of crossing, pass through a protective shield formed by a plate 36 that overlies the bars and has upwardly offset flanges 37 bolted to the bottom boards, as noted in Figs. 1 and 2.

The particular advantage of this tracking of runners is in the drawing of sleds entrain where it is essential for safety that all should follow the same path. Without such tracking provision, the last sled in the train would, in making a turn, cut in or out on a tangent to the curve to a considerable amount, and this could be disastrous when the roadway is through mountainous country.

It is is be observed, by reference to Figs. 1 and 2, that the forward end portions of the rearward set of runners 6—6 are connected and held parallel by a cross rod 40 which, at its ends, has ball and socket connection as at 41 with the end portions of the runners. Likewise, the forward ends of the forward set of runners are connected and held in parallel relationship by a cross rod 45 having ball and socket connection 46 at its ends with the end portions of the runners. The sled is drawn by a tongue 49 that is connected rigidly and securely to the forward cross bar 45 by means of a triangular plate 50 that holds it perpendicular to the cross bar 45. The tongue 49 is tubular, as seen in Fig. 6 in section, and contained therein is a coiled spring 55. A rod 56 extends through the spring lengthwise thereof and has a nut 57 at its inner end for engaging against the spring. The forward end of the rod extends through a restricted opening in the forward end of the tube and has its end rotatably fixed in a short length of tubing 58, which is equipped for attachment to a draft device. Under strain, the coiled spring 55 will yield to eliminate jar and shock in the draft connection.

For connecting the sleds entrain, each is provided at its rear end, centrally thereof, with a downwardly directed U-shaped bracket 65 with its leg portions fixed to the bed as seen in Figs. 1, 2 and 6. This bracket is braced by a bar 66 fixed thereto and to the cross bunk 5. Supported by the base member of the U-shaped bracket 65, is a stud or post 67 with a ball head 68. The forward end tube 58 of the tongue or draft device of each sled is formed with a downwardly opening socket 70 adapted to receive the ball head 68 of a post 67, as shown in Fig. 6. The head 68 when contained in the socket, bears against a concave surface of an end block 72 and may be locked against disconnection by moving a similar block 73 against its opposite side so that the ball 68 will be held pivotally between the parts. As seen in Fig. 6, the block 73 is urged forward or toward block 72 by a spring 75 contained in tube 58, and a lock bolt 76 is threaded through the tube and into the block 73 or against it to hold it against release from the ball 68.

It is anticipated also that the prime mover for the train of sleds will be equipped with a draft post 67 for connection of a sled thereto.

To facilitate the coupling of sleds entrain, a tube 80 is fixed centrally in the bed. This tube extends the full length of the sled and at its forward end extends through a vertical plate 81 fixed to the end beam 2 as seen in Fig. 5. At its rear end it is likewise fixed in a bracket plate 82 that is secured to cross beam 2'.

Assuming that the draft tongue of a sled is to be connected to the draft post 67 of a forward sled, it is first drawn up to the rear of the forward sled but cannot be completely drawn thereto or alined with the forward sled because of required clearance for the tractor or machine drawing it into place. Then a cable or chain as at 83 in Fig. 5, is extended through the tube 80 from end to end, and from its rear end and is attached to the lug 85 on the draft tube 58 of the rear sled as shown in Fig. 1. The forward end of the cable is then attached to a tractor or a powered device, which, on going forward will pull the rear sled into place and will bring its tongue into place so that it can be easily applied to the draft post of the forward sled.

To hold the cable 83 taut until connection of sleds is made, a sliding plate 90 carried on a guide 91 on plate 81 is moved down so that its lower end will holdingly engage the cable or chain where it comes from the forward end of tube 80. This holding plate is provided with a V-shaped notch at its lower end for this purpose.

Having thus described my invention, what I claim as new therein and desire to secure by Letters Patent is:

1. A sled of the character described comprising a bed, cross bunks supporting the bed at front and rear ends, supporting blocks for the bed at opposite ends of the cross bunks, a vertical shaft rotatably mounted in each block, a downwardly opening yoke rigidly fixed to the lower end of each shaft and comprising a flat base plate that is seated against the lower end of the corresponding mounting block and opposite side flanges, a sled runner pivoted between the side flanges of each yoke for up and down rocking action, a runner steering arm fixed to the upper end of each shaft, and links connecting the steering arms of forward runners with those of rearward runners for simultaneous and cooperative steering adjustment of the pairs of runners.

2. A sled as recited in claim 1 including also cross rods pivotally joining paired runners at front and rear to retain them in parallel relationship, and wherein the steering arms of paired shafts extend toward each other and the links which connect paired shafts are in crossed relationship.

3. In a sled of the character described, a bed, runners supporting the bed, a draft post fixed to the bed at the rear end thereof, a cable guide means on the bed lengthwise thereof and aligned with the said post, a cable extended through said guide means and beyond the ends of the sled and having means at its rear end for connection with a similar sled to draw it into position for connection with the said draft post.

4. In a sled of the character described, a bed, runners supporting the bed for travel and steering, a draft post fixed to the bed at the rear end thereof, a cable guide tube mounted on the bed lengthwise thereof, aligned with the said post and extending substantially the full length of the bed, a cable extended through the tube and beyond its ends at front and rear of the sled, a hook at the rear end of the cable for draft connection with a similar sled to draw it into position for connection with the said draft post, and a cable engaging latch at the forward end of the said tube.

5. A sled as recited in claim 4 having a draft tongue attached to the forward set of runners and means on the tongue at its forward end for holding engagement with a draft post of a similar sled.

6. A sled as recited in claim 4 having a draft tongue attached to the forward set of runners, means on the tongue at its forward end for holding engagement with a draft post of a similar sled, and an eyelet on the tongue for the reception of the cable hook of a similar sled.

MILO C. CAUGHREAN.

REFERENCES CITED

The following references are of record in the file of this patent:

UNITED STATES PATENTS

| Number | Name | Date |
| --- | --- | --- |
| Re. 14,116 | Andersen | Apr. 18, 1916 |
| 303,863 | Kinney | Aug. 19, 1884 |
| 435,341 | Yenne | Aug. 26, 1890 |
| 503,639 | Adams | Aug. 22, 1893 |
| 794,861 | Halstead | July 18, 1905 |
| 934,618 | Mohr | Sept. 21, 1909 |
| 1,220,822 | Brothen | Mar. 27, 1917 |
| 1,387,546 | Johnson | Aug. 16, 1921 |
| 2,029,540 | Porteous | Feb. 4, 1936 |
| 2,358,817 | Meehan | Sept. 26, 1944 |